United States Patent
Rife, Jr. et al.

(10) Patent No.: US 12,480,264 B2
(45) Date of Patent: *Nov. 25, 2025

(54) SYSTEM FOR DETERMINING VOLUME OF MATERIAL BEING CUT

(71) Applicant: Caterpillar Paving Products Inc., Brooklyn Park, MN (US)

(72) Inventors: Conwell K. Rife, Jr., Plymouth, MN (US); Nathaniel S. Doy, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 569 days.

This patent is subject to a terminal disclaimer.

(21) Appl. No.: 17/736,202

(22) Filed: May 4, 2022

(65) Prior Publication Data

US 2023/0357999 A1    Nov. 9, 2023

(51) Int. Cl.
  *E01C 23/088*    (2006.01)
  *E01C 23/12*    (2006.01)

(52) U.S. Cl.
  CPC .......... *E01C 23/088* (2013.01); *E01C 23/127* (2013.01)

(58) Field of Classification Search
  CPC ..... E01C 23/088; E01C 23/127; G01B 21/20; G01B 21/28
  See application file for complete search history.

(56) References Cited

U.S. PATENT DOCUMENTS

| | | | |
|---|---|---|---|
| 7,627,410 B2 | 12/2009 | Berry et al. | |
| 9,121,146 B2 | 9/2015 | Paulsen et al. | |
| 10,227,739 B2 | 3/2019 | Laugwitz et al. | |
| 10,323,516 B2 | 6/2019 | Berning et al. | |
| 11,840,810 B2 * | 12/2023 | Rife | E01C 23/127 |
| 2014/0097665 A1 * | 4/2014 | Paulsen | E01C 23/127 |
| | | | 356/601 |
| 2014/0244208 A1 * | 8/2014 | Paulsen | G06Q 50/08 |
| | | | 702/156 |
| 2015/0117951 A1 * | 4/2015 | Schlenker | E01C 23/088 |
| | | | 404/84.05 |
| 2016/0177521 A1 | 6/2016 | Laugwitz et al. | |
| 2016/0348324 A1 * | 12/2016 | Engelmann | E01C 23/127 |
| 2021/0148067 A1 * | 5/2021 | Wagner | E01C 23/088 |
| 2022/0290383 A1 * | 9/2022 | Buschmann | G01B 11/245 |

FOREIGN PATENT DOCUMENTS

| | | | | |
|---|---|---|---|---|
| DE | 102014015661 A1 | 4/2015 | | |
| DE | 102015005194 | 6/2016 | | |
| DE | 102016006351 A1 | 12/2016 | | |
| WO | WO-2015034497 A1 * | 3/2015 | ........... | E01C 23/088 |

* cited by examiner

*Primary Examiner* — Janine M Kreck (57) ABSTRACT

An apparatus of a work machine can include a sensor to provide information regarding a surface worked by a work machine. The apparatus can also include processing circuitry coupled to the sensor. The processing circuitry can generate a cut depth curve that represents cut depth subsequent to performing work on the surface, based on measurements provided by the set of sensors. The processing circuitry can perform an integration operation based on the cut depth curve to generate a measure of area worked by the work machine. The processing circuitry can determine at least one physical operational parameter of the work machine based on the measure of area worked by the work machine. Other systems and methods are described.

20 Claims, 5 Drawing Sheets

SYSTEM FOR DETERMINING VOLUME OF MATERIAL BEING CUT

TECHNICAL FIELD

The present disclosure generally relates to a milling machine. More particularly, the present disclosure relates to a system for calculating the weight and volume of material cut by a milling machine.

BACKGROUND

Milling machines, such as cold planers, are powered machines used to remove at least part of a surface of a paved area such as a road, bridge, or parking lot. Typically, cold planers include a frame, a power source, a milling assembly positioned below the frame, and a conveyor system. The milling assembly includes a cutting rotor having numerous cutting bits disposed thereon. As the cutting rotor rotates, its cutting bits engage the hardened asphalt, concrete, or other materials of an existing surface of a paved area, thereby removing layers of these existing structures.

A measurement or calculation of the milled area or volume is usually required as basis for the settlement of the services rendered for the purpose of documenting and settling the services rendered on the construction site. This data can be calculated or determined based on previously known data, surveying documents, or maps. However, inaccuracies in measurement can result in over- or underpayment of contractors. Another concern is road weight limits and, generally driving permits. If vehicles are overfilled (by weight) fines can be incurred. Alternatively, if vehicles are underfilled, inefficiencies can result. Therefore, there is a general need for more accurate methods and systems to determine the amount of milled area or volume of removed material in a milling process.

U.S. Pat. No. 9,121,146 discusses a system for determining a volume of material milled, as a function of a cross-sectional area of material to be milled in front of the milling drum and a distance traveled by the construction machine while actively milling.

SUMMARY OF THE INVENTION

In an example according to the present disclosure an apparatus of a work machine can comprise a set of sensors to provide information regarding a surface worked by a work machine; and processing circuitry coupled to the sensor and configured to generate a cut depth curve that represents cut depth subsequent to performing work on the surface, based on measurements provided by the set of sensors; perform an integration operation based on the cut depth curve to generate a measure of area worked by the work machine; and determine at least one physical operational parameter of the work machine based on the measure of area worked by the work machine.

Another example can include a work machine comprising a frame; a milling assembly; a set of at least two scanners, at least one of the set of at least two scanners disposed forward of the milling assembly with reference to the frame and at least one of the set of at least two scanners disposed at a rear portion of the milling assembly with reference to the frame, the set of at least two scanners configured to provide information indicative of a depth worked by the work machine relative to an unworked surface around the work machine; and processing circuitry coupled to the set of at least two scanners and configured to: generate, based on information provided by the at least two scanners, a cut depth curve that represents cut depth subsequent to performing work on the surface, based on measurements provided by the set of scanners; perform an integration operation based on the cut depth curve to generate a measure of area worked by the work machine; and determine at least one physical operational parameter of the work machine based on the measure of area worked by the work machine.

Another example can include a method of calculating volume of cut material, the method comprising: receiving information regarding a surface worked by a work machine; generating, based on the received information, a cut depth curve that represents cut depth subsequent to performing work on the surface; performing an integration operation based on the cut depth curve to generate a measure of area worked by the work machine; and determining at least one physical operational parameter of the work machine based on the measure of area worked by the work machine.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
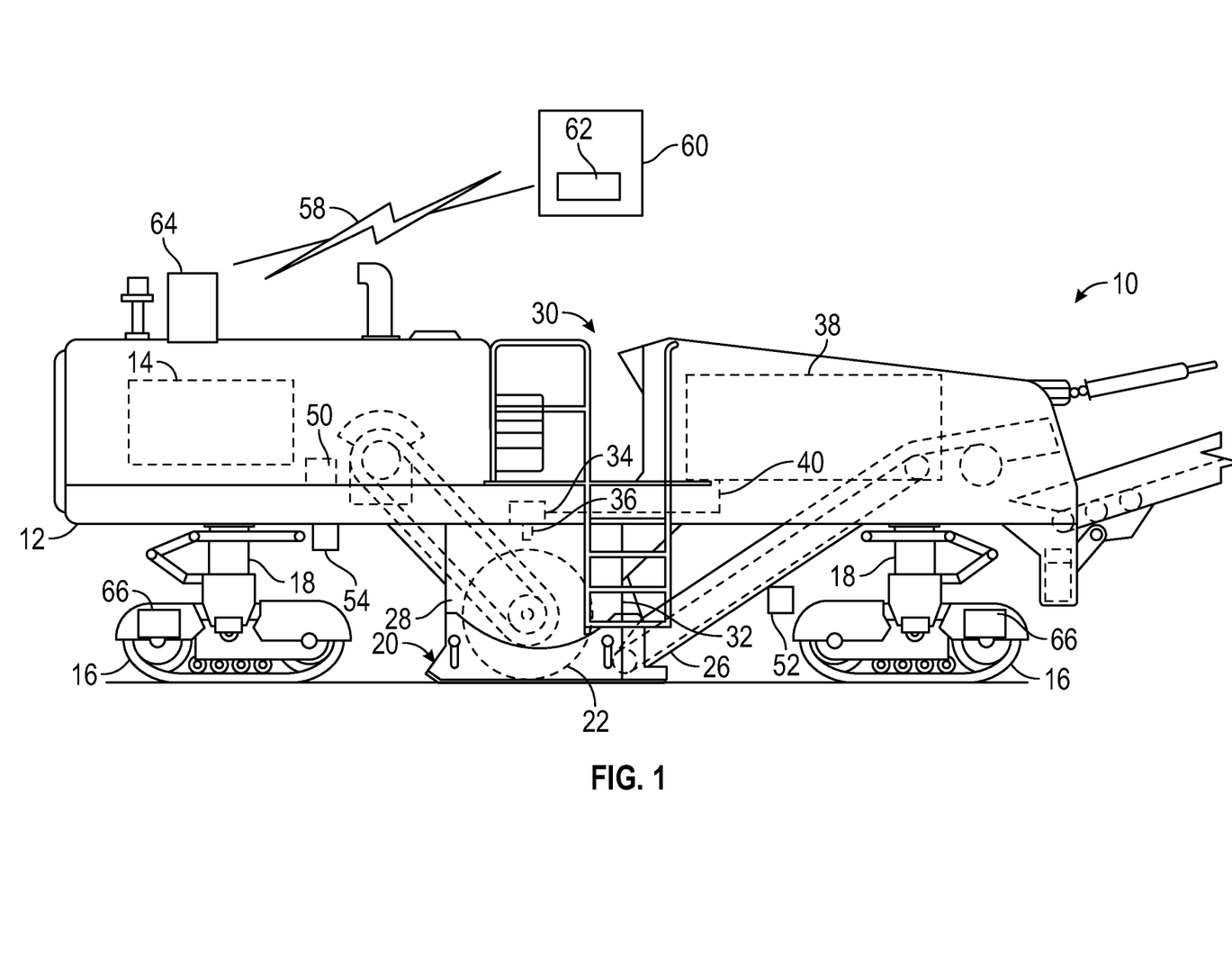
FIG. 1 shows a side view of a cold planer, in accordance with this disclosure.

FIG. 1 shows a side view of a milling machine, such as a cold planer 10, in accordance with one embodiment. While a cold planer 10 is shown, the milling machine can include a rotary mixer or other type of work machine. The cold planer 10 can include a frame 12 and a power source 14 connected to the frame 12. The power source 14 can be provided in any number of different forms including, but not limited to, Otto and Diesel cycle internal combustion engines, electric motors, hybrid engines and the like. The frame 12 is supported by transportation devices 16 via lifting columns 18. The transportation devices 16 may be any kind of ground-engaging device that allows movement of the cold planer 10 in a longitudinal direction over a ground surface, for example a paved road or a ground already processed by the cold planer 10. For example, in the shown embodiment, the transportation devices 16 are configured as track assemblies. The transportation devices 16 can each include circuitry 66 to report speed to the processing circuitry (e.g., controller 50 or apparatus 60). In some examples, distance moved for the cold planer 10 is measured based on a transportation device 16 of the plurality of transportation devices 16 reporting a lowest speed. The lifting columns 18 are configured to raise and lower the frame 12 relative to the transportation devices and the ground.

The cold planer 10 further includes a milling assembly 20 connected to the frame 12. The milling assembly 20 includes a drum housing 28 holding a rotatable cutting rotor 22 operatively connected to the power source 14. The cutting rotor 22 can be rotated about a drum axis (not shown) extending in a direction perpendicular to the frame axis. As the rotatable cutting rotor 22 spins about its drum axis, cutting bits (not shown) on the cutting rotor 22 can engage hardened materials, such as, for example, asphalt and concrete, of existing roadways, bridges, parking lots and the like. As the cutting bits engage such hardened materials, the cutting bits remove layers of these hardened materials. The spinning action of the cutting rotor 22 and its cutting bits then transfers the hardened materials to a first stage conveyor 26 via a discharge port 32 on the drum housing 28. The first stage conveyor 26 can be coupled to the frame 12 and located at or near the discharge port 32 of the drum housing 28.

The cold planer 10 further includes an operator station or platform 30 including an operator interface for inputting commands to a control system for controlling the cold planer 10, and for outputting information related to an operation of the cold planer 10. The cold planer 10 can include a spray system coupled to the frame 12 and including a tank 38 and a fluid line 40 which delivers a cooling fluid from the tank 38 to a spray bar 34 having a plurality of nozzles 36. The spray system can spray water or other fluid onto the cutting rotor 22 or onto the material cut by the cutting rotor 22.

A controller 50 can be provided for electrically controlling various aspects of the cold planer 10. For example, the controller 50 can send and receive signals from various components of the cold planer 10 during the operation of the cold planer 10. The controller 50 can include onboard memory or memory in a remote location can be accessed. For example, the cold planer 10 and controller 50 thereof can be wirelessly communicatively connected using connection 58 to remote apparatus 60 which can include memory 62. The memory 62 can store a database that includes at least a table of material types and corresponding densities of each material type for calculation of, for example, weight of material removed as described later herein.

The cold planer 10 may further include a location sensor 64 connected at one or more locations. The location sensor 64 may be capable of determining a location of the cold planer 10 and may include and/or comprise a component of a global positioning system (GPS). For example, the location sensor 64 may comprise a GPS receiver, transmitter, transceiver or other such device, and the location sensor 64 may be in communication with one or more GPS satellites to determine a location of the cold planer 10 continuously, substantially continuously, or at various time intervals.

It may be desirable to know the volume of material worked, or removed, by the cold planer 10. This information can be used, for example, for contractor billing, cost estimation, etc. Available methods and systems for determining the volume of material are generally inaccurate, and a general need exists for improved accuracy of measuring or determining the volume or weight of material being cut by a cold planer 10 and similar machines.

The present disclosure addresses these concerns by incorporating a sensor to provide information regarding a surface worked by a work machine. The sensor can include a set of at least two scanners 52, 54. Scanners 52 and 54 can be included or placed at, for example, the front and rear (or front and rear portion/s) of the cold planer 10 or e.g., forward or to the rear of the milling assembly 20. The scanners 52, 54 can be used (e.g., by the controller 50 or other processing circuitry) to define the profile of a working surface before and after work (e.g., cutting) is performed by the cold planer 10, as will be described in more detail later herein. Scanners 52, 54 can including contacting or non-contacting scanners, optics, etc.

Processing circuitry (e.g., a component of controller 50 or other processing circuitry local or remote to the cold planer 10) can be coupled to the sensors (e.g., scanners 52, 54). The sensors (e.g., scanners 52, 54) can output discrete image points at a given resolution based on the capability of the components selected, mounting geometry, and present height of the machine frame above the surface. The outputs of the sensors can be used to generate a set of measurements (e.g., a curve) representative of a surface before performing work on the surface and a second curve representative of the surface subsequent to performing work on the surface. These curves can be compared directly using a set of horizontal coordinates as a reference.

Figure 2:
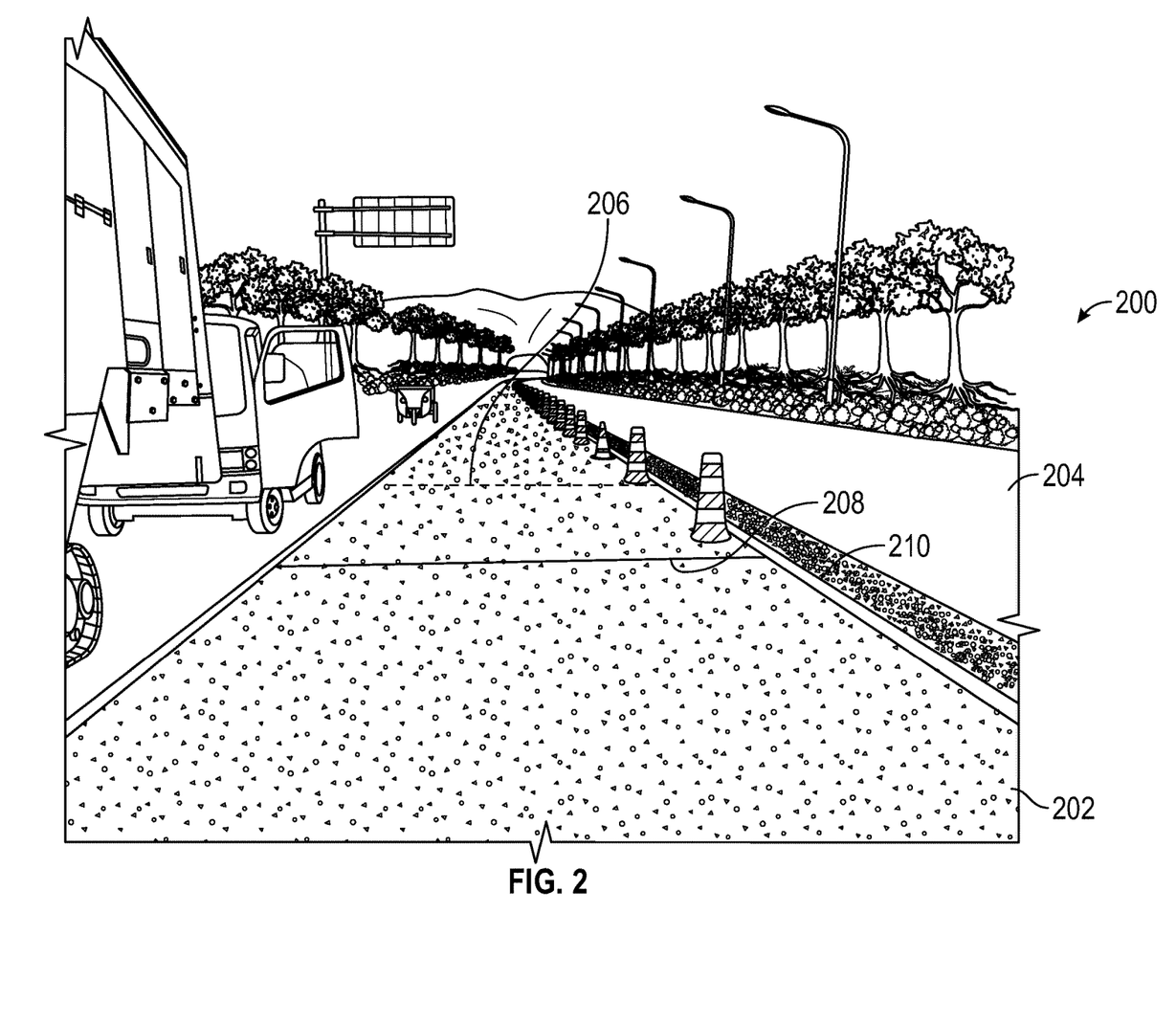
FIG. 2 illustrates a perspective depiction of a work surface indicating points at which measurements can be provided by the scanners in accordance with some examples.

FIG. 2 illustrates a perspective depiction 200 of a work surface indicating points at which measurements can be provided by the scanners 52, 54 in accordance with some aspects. FIG. 2 depicts the work environment looking in a direction of travel of the cold planer 10 or other work machine. Surface 202 represents a milled surface, for example a surface that has been worked by the cold planer 10 or other work machine. Surface 204 represents, by way of comparison, a surface that has not been worked by the cold planer 10 or other work machine. Lines 206 and 208 can represent scans provided by scanners 52, 54. Depth 210 can represent a number of inches of material that was removed from the unworked surface 204 in a work machine process.

Figure 3A:
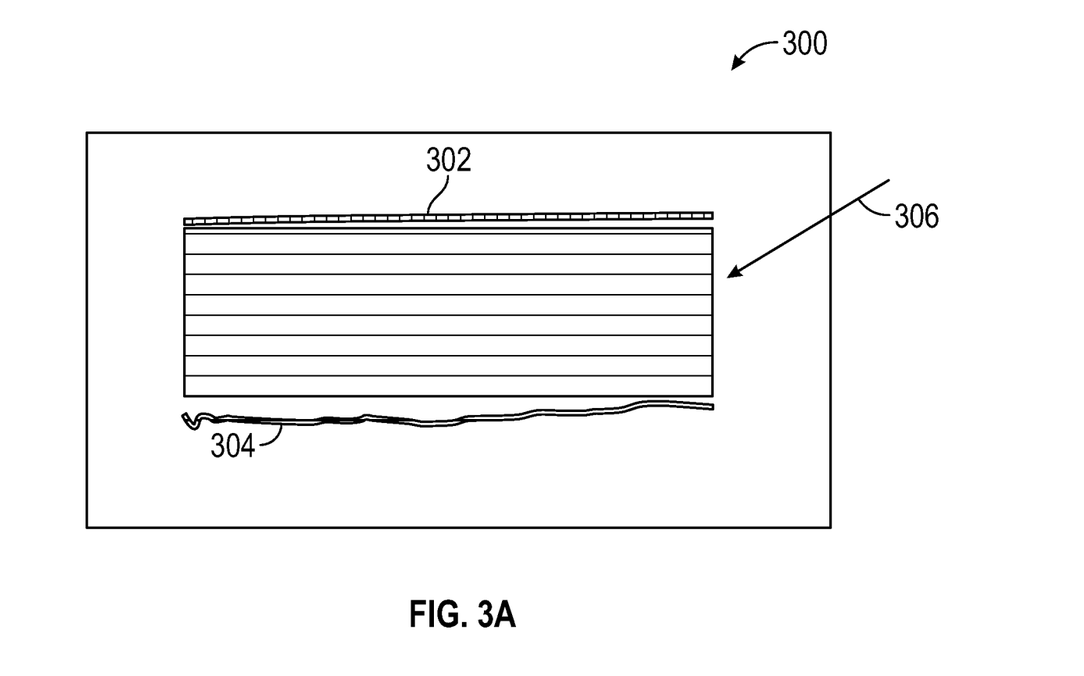
FIG. 3A illustrates a planar view of curves generated by scanners in accordance with some examples.

FIG. 3A illustrates a planar view 300 of curves 302, 304 generated by scanners 52, 54 measurement in accordance with some examples. The first curve 302 represents an unworked surface (e.g., surface 204 (FIG. 2)). The first curve 302 may not be straight due to road surface conditions such as potholes, depressions, etc. The second curve 304 represents actual cut depth for one scan of the scanners 52, 54. The second curve 304 may not be straight due to bit size and other aspects of the cold planer 10.

Figure 3B:
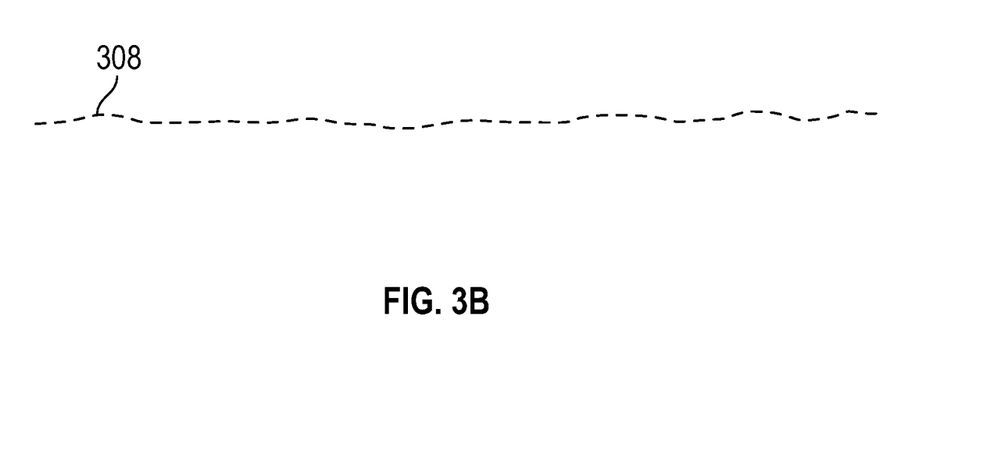
FIG. 3B illustrates cut depth in accordance with some examples.

Processing circuitry (e.g., of the controller 50 or remote processing circuitry) can perform an integration operation based on the first curve 302 and the second curve 304 to generate a measure of area worked by the work machine. For example, integration can be performed to determine the area 306 between the first curve 302 and the second curve 304. In some examples, curve 302 and curve 304 can be compared to generate a third curve 308, shown in FIG. 3B, that represents the difference in depth from a front scanner 52 to a rear scanner 54 of the cold planer 10. An integration operation can then be performed using that third curve. Alternatively, a series of summations can be undertaken to generate a sum of a number of slices of area between the first curve 302 and the second curve 304. The integration operation can be based on an upper limit representative of the first curve 302 and further based on a lower limit representative of the second curve 304. The result of the integration will represent the amount of area of material removed during a work process of the machine (e.g., cold planer 10). Volume of material removed can be determined knowing the amount of distance traveled by the cold planer 10 (or other work machine) during the generation of curves 302 and 304.

The processing circuitry can receive information indicative of a depth worked by the work machine (e.g., cold planer 10) relative to an unworked surface 204 around the work machine and to generate the first curve 302 and the second curve 304 based on the information indicative of the depth. For example, as shown in FIG. 3A, information regarding depth 210 can be retrieved or generated based on statistical curve fitting of information provided by the scanners 52, 54, and/or on work plans provided to an operator of the cold planer 10.

Based on the resulting area obtained from the integration, the processing circuitry (e.g., controller 50 or component thereof, or remote processing circuitry) can determine at least one physical operational parameter of the work machine (e.g., cold planer 10) based on the measure of area worked by the work machine. For example, this physical operational parameter can include the volume of material removed by the work machine based on the area calculated multiplied by the distance traveled by the work machine. The weight of the material removed can be determined based on the calculated volume and the density of the material (e.g., asphalt). The density of the material can be known a priori and/or can vary based on known factors such as added water, humidity, temperature, etc. The volume (and thereby weight) of the material removed can be determined with improved accuracy, relative to other available methods, because accuracy is based on accuracy of scanner measurements from which the first curve and second curve are determined. The accuracy of material weight and volume measurements can in turn allow contractors and work machine operators to provide fair and accurate billing statements based on the material being removed. These calculations can either be done by on board or off board processing and transmitted directly to other locations needing the information.

Figure 4:
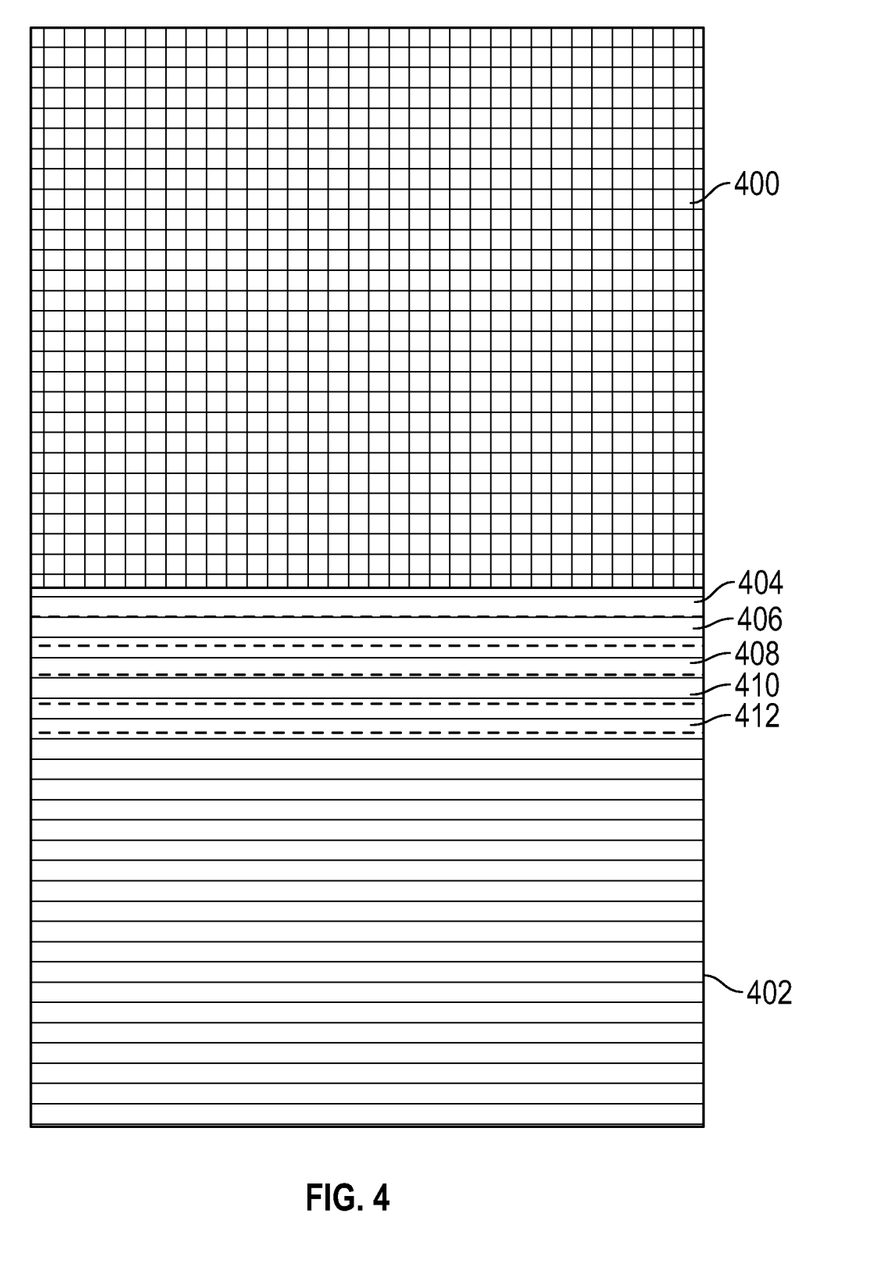
FIG. 4 illustrates example points at which sensor measurements are taken n accordance with some examples.

FIG. 4 illustrates example points at which sensor measurements can be taken in accordance with some aspects. Area 400 represents the uncut surface (e.g., unworked surface 204 (FIG. 2)) of a road. Area 402 represents the cut surface (e.g., worked surface 202 (FIG. 2)) of a road. Each segment 404, 406, 408, 410, 412 represents a distance traveled by a cold planer 10 over which a new area can be calculated through integration operations as defined above with respect to FIGS. 3A and 3B.

Figure 5:
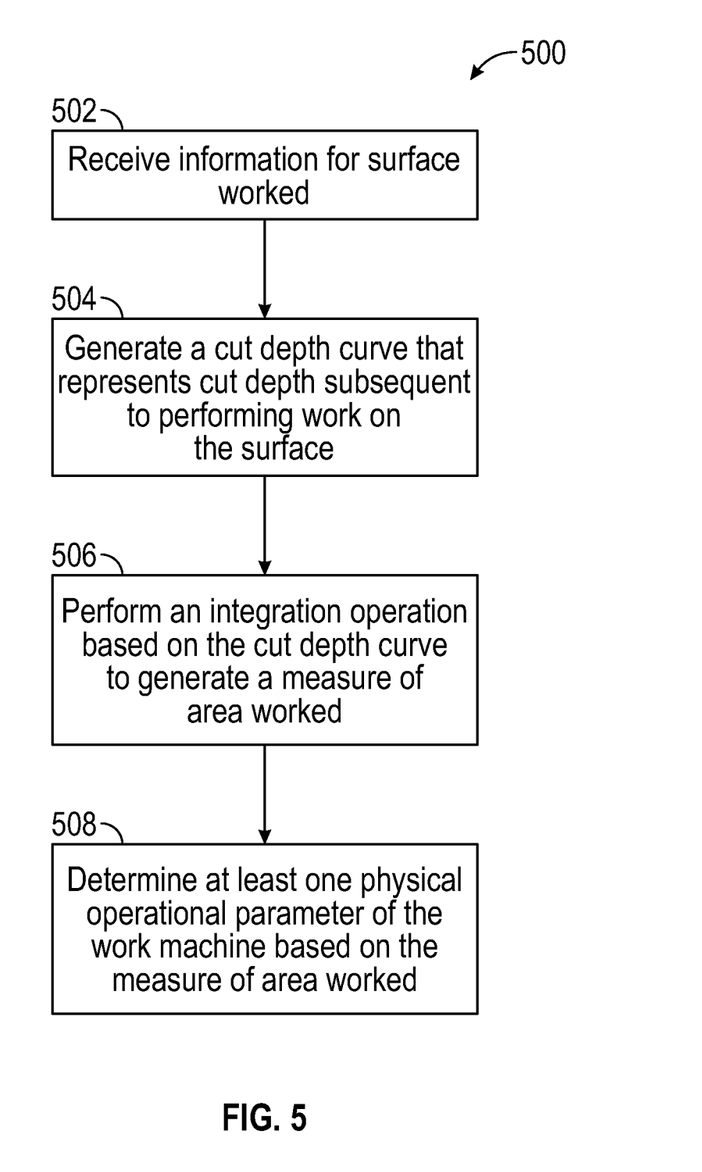
FIG. 5 is a flowchart depicting an example method for calculating volume of cut material, in accordance with this disclosure.

FIG. 5 is a flowchart depicting an example method 500 for calculating a volume of cut material in accordance with this disclosure. The method 500 can be performed by elements of the cold planer 10, including in particular the controller 50, scanners 52, 54, and apparatus 60.

The method 500 can begin with operation 502 with processing circuitry (e.g., controller 50) receiving information regarding a surface (e.g., worked surface 202 (FIG. 2)) worked by a work machine (e.g., cold planer 10). The method 500 can continue with operation 504 with the controller 50 generating, based on the received information, a cut depth curve that represents cut depth subsequent to performing work on the surface.

The method 500 can continue with operation 506 with performing an integration operation based on the cut depth curve to generate a measure of area worked by the work machine, as described above with reference to FIGS. 2-4. The method 500 can continue operation 508 with determining at least one physical operational parameter of the work machine based on the measure of area worked by the work machine.

Further information, including depth of the area worked, can be received and this information can be used to determine total volume of the material removed by the cold planer 10, as described earlier herein.

INDUSTRIAL APPLICABILITY

In general, cold planer 10 can be configured and equipped to calculate volume of material removed by the cold planer 10. For example, a controller 50 can receive information from scanners 52, 54 regarding a surface worked by the cold planer 10. Based on the information received from the scanners 52, 54, the controller can generate first and second curves representative of this surface, and perform an integration to find the area between the curves. A physical operational parameter of the cold planer 10 can be determined based on this area, including for example the volume of the material worked, the weight of the material worked, and other parameters.

The above detailed description is intended to be illustrative, and not restrictive. The scope of the disclosure should, therefore, be determined with references to the appended claims, along with the full scope of equivalents to which such claims are entitled.

LIST OF ELEMENTS 10 cold planer
12 frame
14 power source
16 transportation devices
18 lifting columns
20 milling assembly
22 cutting rotor
26 first stage conveyor
28 drum housing
30 platform
32 discharge port
34 spray bar
36 nozzles
38 tank
40 fluid line
50 controller
52 scanner
54 scanner
200 depiction
202 surface
204 surface
206 line
208 line
210 depth
300 simplified depiction
302 first curve
304 second curve

What is claimed is:
1. An apparatus of a work machine, the apparatus comprised of:
a frame;
a milling assembly;
a set of sensors to provide information regarding a surface worked by the work machine, wherein the set of sensors comprises:
a first sensor; and
a second sensor; and
processing circuitry coupled to the set of sensors, the processing circuitry configured to:

generate a cut depth curve that represents cut depth along a cut width subsequent to performing work on the surface, based on measurements provided by the set of sensors;
perform an integration operation at a plurality of discrete points along the cut width based on the cut depth curve to generate a measure of area worked by the work machine; and
determine at least one physical operational parameter of the work machine based on the measure of area worked by the work machine.

2. The apparatus of claim 1, wherein the processing circuitry is configured to generate, based on information provided by the first sensor of the set of sensors, a first curve representative of the surface before performing work on the surface and, based on the second sensor of the set of sensors, a second curve representative of the surface subsequent to performing work on the surface that takes into account variation of bit size.

3. The apparatus of claim 2, wherein performing the integration operation based on the cut depth curve to generate the measure of area worked by the work machine comprises:
the processing circuitry determining an area between the first curve and the second curve.

4. The apparatus of claim 2, wherein performing the integration operation based on the cut depth curve to generate the measure of area worked by the work machine comprises:
the processing circuitry subtracting the second curve from the first curve to generate the cut depth curve; and
the processing circuitry determining an area underneath the cut depth curve.

5. The apparatus of claim 2, wherein performing the integration operation based on the cut depth curve to generate the measure of area worked by the work machine comprises:
integrating the cut depth curve at each of the plurality of discrete points along the cut width at each discrete point output by the first sensor and the second sensor.

6. The apparatus of claim 1, wherein the processing circuitry is further configured to receive information indicative of a depth worked by the work machine relative to an unworked surface around the work machine and to generate the cut depth curve based on the information indicative of the depth.

7. The apparatus of claim 1, wherein the at least one physical operational parameter includes volume of material removed by the work machine, and wherein the processing circuitry is further configured to provide a calculation of the volume of material removed by the work machine based on distance moved by the work machine and on the measure of area worked by the work machine.

8. The apparatus of claim 1, wherein the processing circuitry is local to the work machine.

9. A work machine comprising:
a frame;
a milling assembly;
a set of at least two scanners, at least one of the set of at least two scanners disposed forward of the milling assembly with reference to the frame and at least one of the set of at least two scanners disposed at a rear portion of the milling assembly with reference to the frame, the set of at least two scanners configured to provide information indicative of a depth worked by the work machine relative to an unworked surface around the work machine; and processing circuitry coupled to the set of at least two scanners and configured to:
generate, based on information provided by the at least two scanners, a cut depth curve that represents cut depth subsequent to performing work on the surface, based on measurements provided by the set of scanners;
perform an integration operation based on the cut depth curve to generate a measure of area worked by the work machine; and
determine at least one physical operational parameter of the work machine based on the measure of area worked by the work machine.

10. The work machine of claim 9, wherein the processing circuitry is configured to generate, based on information provided by a first scanner of the set of scanners, a first curve representative of the surface before performing work on the surface and, based on a second scanner of the set of scanners, a second curve representative of the surface subsequent to performing work on the surface.

11. The work machine of claim 9, wherein the processing circuitry is further configured to receive information indicative of a depth worked by the work machine relative to an unworked surface around the work machine and to generate the cut depth curve based on the information indicative of the depth.

12. The work machine of claim 9, wherein the work machine comprises a cold planer, and wherein the processing circuitry is further configured to provide an estimate about material removed by the cold planer, the work machine further comprises memory to store a database, and wherein the database includes at least a table of material types and corresponding densities of each material type, and wherein the processing circuitry is configured to calculate weight of material removed based on data stored in the table of material types.

13. The work machine of claim 12, further comprising:
a plurality of transportation devices for supporting the frame, the plurality of transportation devices each including circuitry to report speed to the processing circuitry.

14. The work machine of claim 13, wherein distance moved is measured based on a transportation device of the plurality of transportation devices reporting a lowest speed relative to others of the plurality of transportation devices.

15. The work machine of claim 9, wherein performing the integration operation based on the cut depth curve to generate the measure of area worked by the work machine comprises:
the processing circuitry determining an area between a first curve generated by a first of the set of at least two scanners and a second curve generated by a second of the set of at least two scanners.

16. The work machine of claim 9, wherein performing the integration operation based on the cut depth curve to generate the measure of area worked by the work machine comprises:
the processing circuitry subtracting a second curve generated by a second of the set of at least two scanners from a first curve generated by a first of the set of at least two scanners to generate the cut depth curve; and
the processing circuitry determining an area underneath the cut depth curve.

17. The work machine of claim 9, wherein performing the integration operation based on the cut depth curve to generate the measure of area worked by the work machine comprises:

integrating the cut depth curve at each of a plurality of discrete points along a cut width at each discrete point output by a first scanner of the set of at least two scanners and a second scanner of the set of at least two scanners.

18. A method of calculating volume of cut material for a work machine, the method comprising:
- receiving, at processing circuitry, information regarding a surface worked by the work machine, the information generated by a set of at least two scanners mounted to the work machine, the set of at least two scanners in communication with the processing circuitry;
- generating with the processing circuitry, based on the received information, a cut depth curve that represents cut depth along a cut width subsequent to performing work on the surface;
- performing with the processing circuitry an integration operation at a plurality of discrete points along the cut width based on the cut depth curve to generate a measure of area worked by the work machine;
- determining with the processing circuitry at least one physical operational parameter of the work machine based on the measure of area worked by the work machine; and
- outputting a signal indicative of the volume of the material cut by the work machine.

19. The method of claim 18, further comprising:
- receiving information indicative of a depth worked by the work machine relative to an unworked surface around the work machine; and
- generating the cut depth curve based on the information indicative of the depth.

20. The method of claim 18, wherein the at least one physical operational parameter includes volume of material removed by the work machine, and wherein the method further comprises providing an estimate of the volume of material removed by the work machine based on distance moved by the work machine and on the measure of area worked by the work machine.

* * * * *